United States Patent [19]

Epworth et al.

[11] Patent Number: 5,608,571

[45] Date of Patent: Mar. 4, 1997

[54] OPTICAL AMPLIFIERS

[75] Inventors: Richard E. Epworth, Sawbridgeworth, United Kingdom; Andrew N. Robinson, Plano, Tex.; Moira J. Stewart, Harlow, United Kingdom

[73] Assignee: Northern Telecom Limited, Montreal, Canada

[21] Appl. No.: 539,626

[22] Filed: Oct. 5, 1995

[30] Foreign Application Priority Data

Oct. 4, 1994 [GB] United Kingdom ............. 9420132

[51] Int. Cl.$^6$ .................................................. H01S 3/00
[52] U.S. Cl. ........................ 359/341; 359/337; 359/124
[58] Field of Search ................................. 359/341, 337, 359/124

[56]  References Cited

U.S. PATENT DOCUMENTS

| 5,260,823 | 11/1993 | Payne et al. | 359/341 |
|---|---|---|---|
| 5,271,024 | 12/1993 | Huber | 359/341 X |
| 5,283,686 | 2/1994 | Huber | 359/337 |
| 5,323,404 | 6/1994 | Grubb | 372/6 |
| 5,434,702 | 7/1995 | Byron | 359/341 |
| 5,452,116 | 9/1995 | Kirkby et al. | 359/124 |

FOREIGN PATENT DOCUMENTS

| 0242802 | 10/1987 | European Pat. Off. . |
|---|---|---|
| 0305995 | 3/1989 | European Pat. Off. . |
| 0559356 | 9/1993 | European Pat. Off. . |
| 3269522 | 2/1992 | Japan . |
| 2043240 | 10/1980 | United Kingdom . |
| 2257320 | 1/1993 | United Kingdom . |
| 2276787 | 10/1994 | United Kingdom . |

*Primary Examiner*—Mark Hellner
*Attorney, Agent, or Firm*—Lee, Mann, Smith, McWilliams, Sweeney & Ohlson

[57] ABSTRACT

An optical amplifier for a wavelength multiplexed transmission system has a set of optically amplifying fibres (26a, 26b) each provided with an associated spectrally selective Bragg reflector (27a, 27b). The amplifying fibres are optically coupled with a coupler (23) such that an optical signal having different spectral components launched into an input (21a) of the coupler is emitted from an output (21b) of the coupler after the different components have propagated through different ones of the amplifying fibres each after reflection in its associated reflector.

10 Claims, 8 Drawing Sheets

OPTICAL AMPLIFIERS

BACKGROUND TO THE INVENTION

Figure 1:
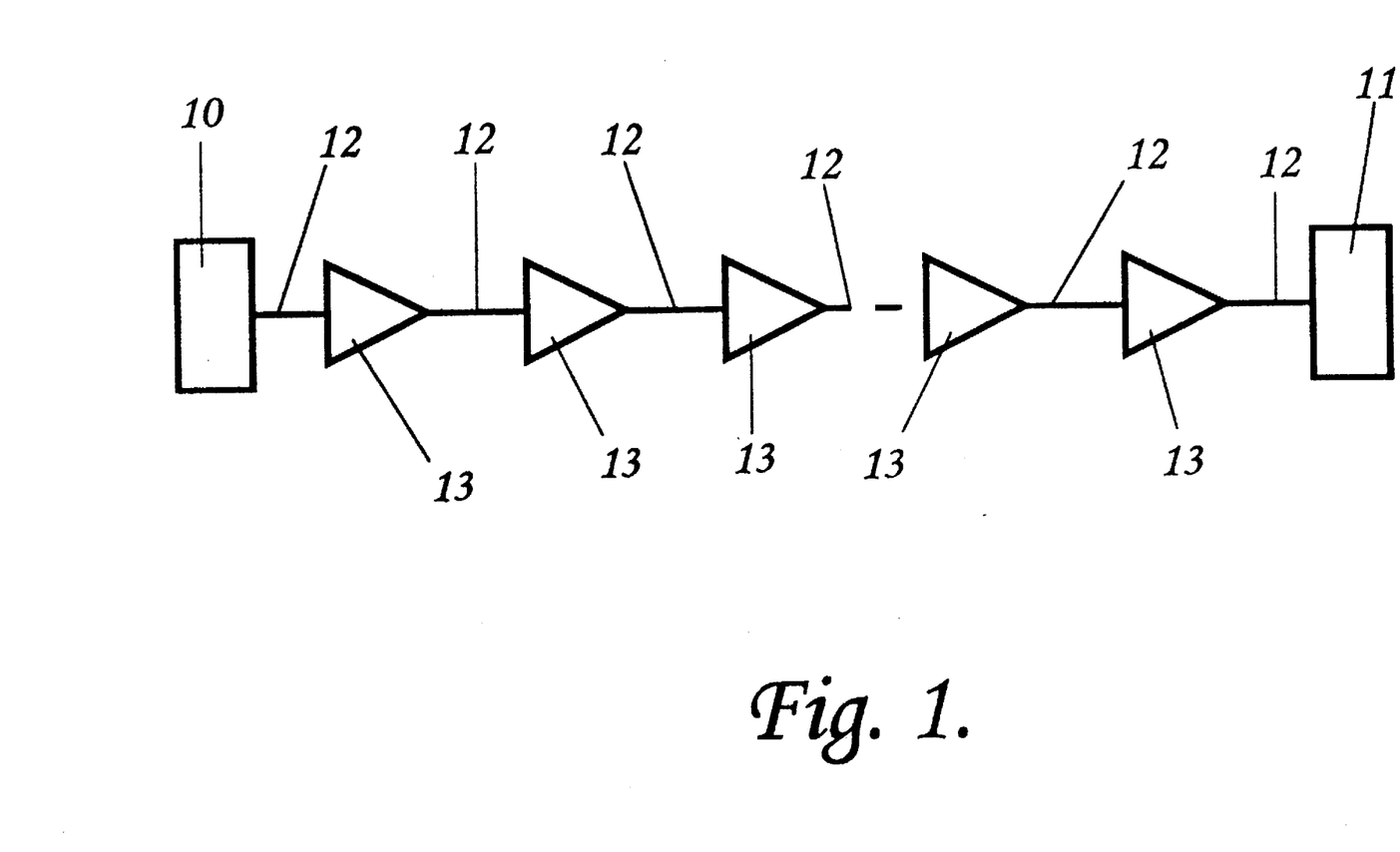
FIG. 1 (to which reference has already been made) is a schematic diagram of a transmission system in which one or more such amplifiers may usefully be employed.

This invention relates to optical amplifiers, in particular to optical amplifiers for handling wavelength multiplexed signals, and to optical transmission systems incorporating such optical amplifiers. Such a system may for instance comprise a wavelength division multiplexed signal transmitter 10 (FIG. 1) optically coupled with an optical receiver 11 by way of a transmission path 12 that includes a cascade of amplifiers 13 optically in series.

In a transmission system that does not employ wavelength multiplexing, a single optical channel can be transmitted through a cascade of quite a number of optical amplifiers before its form has degenerated to the point at which full regeneration is required. The spectral gain characteristic of a typical optical amplifier, such as an erbium doped fibre amplifier, is wide enough to support amplification of several wavelength multiplexed signal channels. However the spectral gain characteristic is not entirely uniform over its full usable spectral range. Thus an erbium doped fibre amplifier may show a significant peak in its gain characteristic near the short wavelength end of that characteristic. The use of filters to flatten such characteristics is known, but is still liable to leave the characteristic with residual undulations. Therefore, if a wavelength multiplexed set of signal channels is transmitted through a concatenation of such amplifiers, those channels registering with any slight troughs in the gain characteristic will not be amplified as much as other channels registering with any slight peaks. Quite a small difference in gain per amplifier can become quite significant in a long concatenation of amplifiers because the difference is multiplied by the number of amplifiers. Thus for instance if there is 0.5 dB difference in gain per amplifier between a channel at wavelength $\lambda_1$ and a channel at wavelength $\lambda_2$ then, if both channels were launched with equal power, after passage through a concatenation of 20 such amplifiers, those channels would differ in power by 10 dB, thereby bringing the weaker channel much closer to, or even beneath, the noise floor. An additional problem is associated with the fact that the ratio of the gain of such an amplifier at two wavelengths $\lambda_1$ and $\lambda_2$ is functionally dependent upon the gain provided by that amplifier, and so if a particular amplifier is adjusted to provide equal gain for two wavelength multiplexed channels at a particular drive level, for instance by selective attenuation of the wavelength of one of the channels then that equality will not be maintained if the drive level has subsequently to be increased (or reduced).

One way of overcoming, or at least ameliorating, these problems is to arrange, in at least some of the amplifiers, for the channels to be demultiplexed, separately amplified, and then remultiplexed. Such an arrangement is described in GB 2 276 787, to which attention is directed.

SUMMARY OF THE INVENTION

The present invention is directed to a similar approach but using a folded design of optical amplifier. This is advantageous in affording the possibility of reduced component count in certain instances by avoiding the requirement to use one set of components for demultiplexing and than another for re-multiplexing. Additionally it facilitates the shaping of the spectral channel pass-band separation, allowing these pass-bands to be defined for instance by optical waveguide Bragg grating reflectors whose spectral reflection characteristics can be shaped, for instance by saturation (overwriting) effects or by chirping, so as to provide relatively flat-topped pass-bands of desired spectral width. Relatively steep-sided cut-offs can be provided by shading (apodising) the depth of modulation at the ends of such gratings.

According to the present invention there is provided, in a wavelength division multiplexed transmission system having a transmission path including a concatenation of optical amplifiers, a method of reducing the disparity in signal power of the multiplexed channels by performing an amplification at at least one of the amplifiers in a manner such that the final portion of the amplification of each channel in that amplifier is performed separately from the final portion of the amplification of each of the other channels.

The invention also provides an optical amplifier including a plurality of optically amplifying waveguides $w/g_1$ to $w/g_n$, each provided with an associated spectrally selective reflector $r_1$ to $r_n$ respectively reflective at spectrally separated wavebands $\lambda_1$ to $\lambda_n$, which plurality of optically amplifying waveguides is optically coupled with a waveguide splitter/combiner such that an optical signal having different spectral components in different ones of the wavebands $\lambda_1$ to $\lambda_n$ that is launched into an input terminal of the waveguide splitter/combiner is emitted from an output terminal thereof after the different components have propagated through different ones of the optically amplifying waveguides $w/g_1$ to $w/g_n$, each, after reflection in its associated spectrally selective reflector.

BRIEF DESCRIPTION OF THE DRAWINGS

There follows a description of optical amplifiers embodying the present invention in preferred forms. The description refers to the accompanying drawings in which.

DETAILED DESCRIPTION OF PREFERRED EMBODIMENTS

Figure 2:
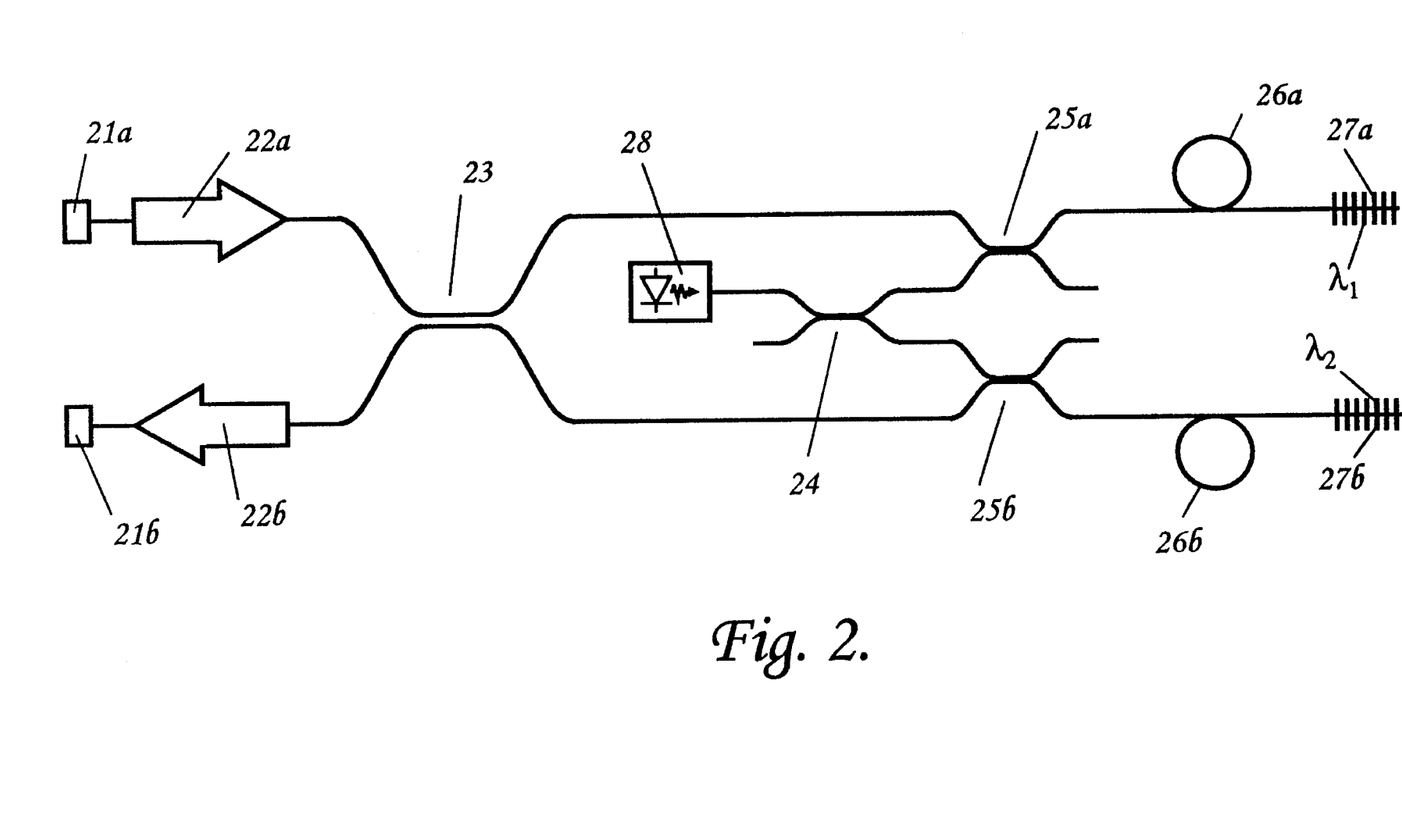
FIGS. 2 to 8 are schematic diagrams of optical amplifiers embodying the invention in different preferred forms and suitable for use in the transmission system of FIG. 1

Referring to FIG. 2, an amplifier embodying the present invention in one preferred form is designed for a two-channel wavelength multiplexed system with channels, for instance at $\lambda_1$=1.557 µm and $\lambda_2$=1.533 µm. This comprises input and output ports 21a and 21b, 2 isolators 22a and 22b, two 3 dB fibre couplers 23 and 24, two wavelength multiplexing fibre couplers 25a and 25b, two lengths of optically amplifying erbium doped fibre 26a and 26b, two Bragg reflectors 27a and 27b, and an optical pump laser 28. A wavelength multiplexed input signal having components at $\lambda_1$ and $\lambda_2$, and applied to input port 21a is divided into two equal amplitude portions by 3 dB coupler 23. Similarly light from the pump laser 28 is divided into two equal amplitude portions by 3 dB coupler 24. Pump/signal wavelength multiplexing couplers 25a and 25b respectively multiplex the two signal portions with the two pump portions to provide two pump/signal multiplexed inputs for respectively launching into optical amplifier fibres 26a and 26b. The signal portions of both of these inputs contain both wavelength components. Bragg grating 27a is however selectively reflective at $\lambda_1$ while Bragg grating 27b is selectively reflective at $\lambda_2$. Therefore, in the arm of the amplifier containing coupler 25a amplifying fibre 26a and Bragg reflector 27a, the $\lambda_2$ component in amplifier fibre 26a is not reflected back to 3 dB coupler 24, nor, in the arm of the amplifier containing coupler 25b amplifying fibre 26b and Bragg reflector 27b, is the $\lambda_1$ component in amplifier fibre 26b. The $\lambda$component thus experiences a first amplification stage in its forward passage through amplifier fibre 26a towards Bragg reflector 27a in which it is being amplified in association with the $\lambda_2$ component. In this first stage of amplification it will therefore still be affected by competition between the two signal components. This first stage is however followed by a second stage of amplification, the stage at which the light has been reflected by the Bragg reflector 27a, and is propagating back through amplifier fibre 26a towards the 3 dB coupler 24. In this second stage of amplification there is no $\lambda_2$ component to compete with the amplification of the $\lambda_1$ component. Similarly, the $\lambda_2$ component experiences two stages of amplification respectively in its forward and return passages through amplifier fibre 26b, and similarly there is competition with the $\lambda_1$ component in the first stage of amplification, but not in the second. After the second stage of amplification, the amplified signals propagate back through their respective signal/ pump wavelength multiplexers 25a and 25b and back to 3 dB coupler 24 where half the amplified signal power is directed through isolator 22b and on to output port 21b.

In implementing the design of FIG. 2, care normally needs to be taken to ensure that any $\lambda_2$ component of signal power propagating back through coupler 25a into 3 dB coupler 24 from amplifying fibre 26a must be well down in power compared with that of the $\lambda_2$ component propagating back through the other arm through coupler 25b from amplifying fibre 26b. Similarly any $\lambda_1$ component propagating back through coupler 8 should normally be at a much smaller power level than that propagating back through coupler 25a. If this is not the case, then the operation of the amplifier is complicated by Michelson interferometer type interference effects.

A Bragg reflector with a relatively flat-topped narrow spectral pass-band can be provided by creating a 'saturated' (over-written) grating or by chirping. Its spectral characteristics can be modified by 'shading' the depth of modulation at the ends of the grating, but it is still liable to exhibit side-bands which in some circumstances can be troublesome.

Figure 3:
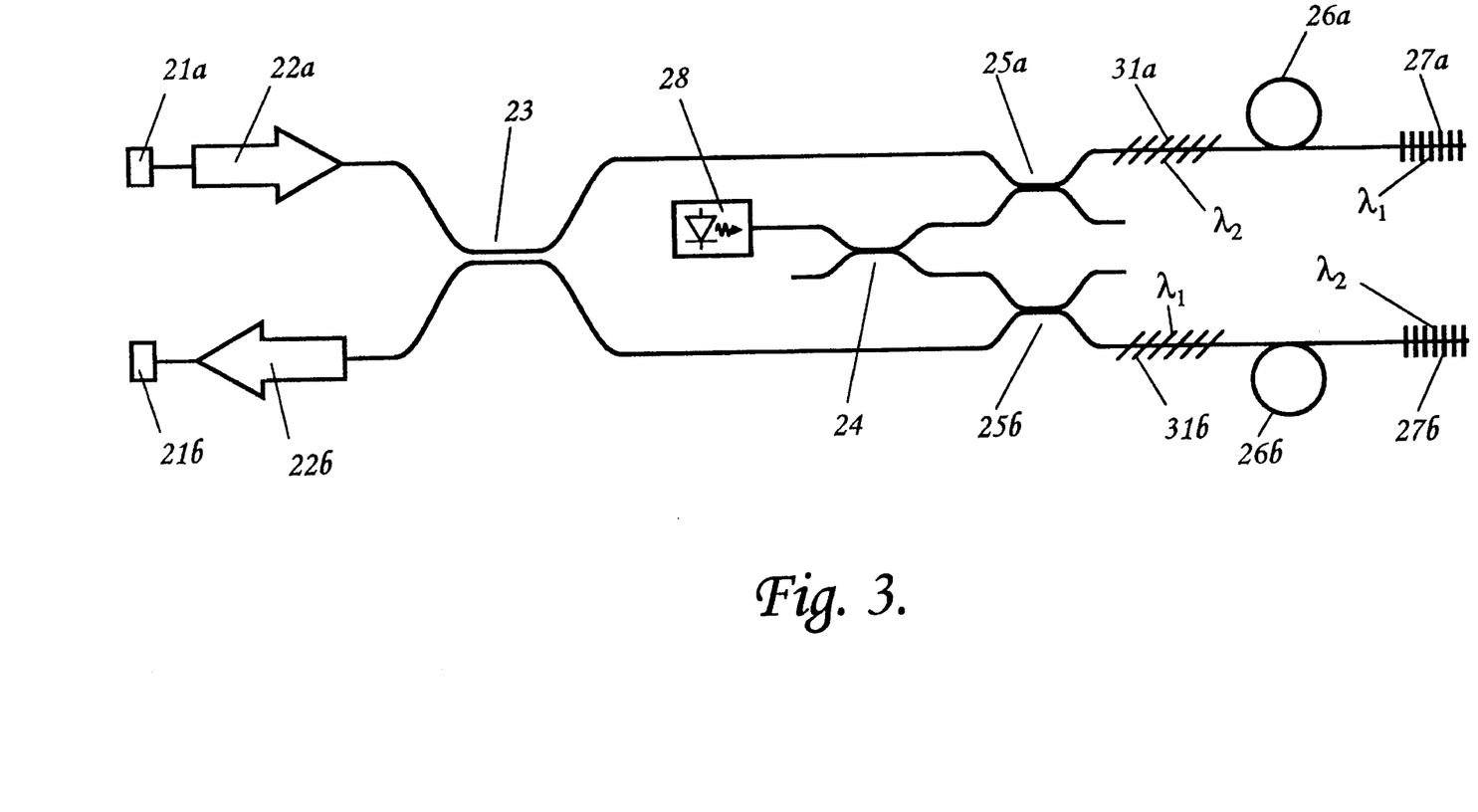

In FIG. 3 there is depicted an amplifier that employs a way of improving the selectivity between the two arms. This amplifier is distinguished from that of FIG. 2 by the inclusion of two blazed Bragg gratings 31a and 31b respectively located between coupler 25a and amplifying fibre 26a, and between coupler 25b and amplifying fibre 26b. Blazed grating 31a is constructed to be radiating at $\lambda_2$, while blazed grating 31b is radiating at $\lambda_1$.

Figure 4:
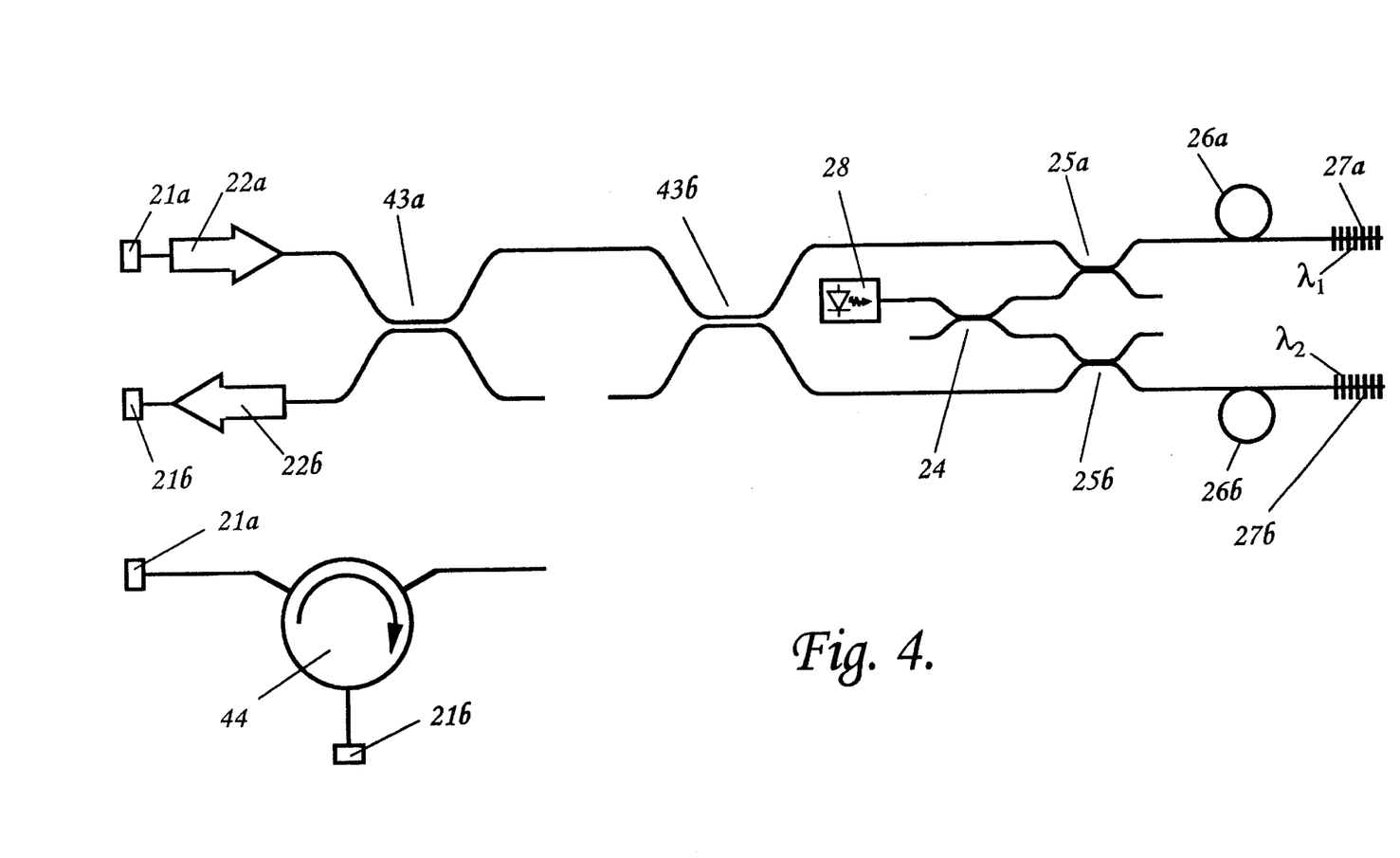

Another way of improving the selectivity between the two arms is employed in the amplifier of FIG. 4. This amplifier is distinguished from that of FIG. 2 by replacing the single 3 dB coupler 23 of FIG. 2 with the series combination of two fibre couplers 43a and 43b. Coupler 43a is similarly a 3 dB coupler, whereas coupler 43b is a $\lambda_1\lambda_2$ wavelength multiplexing coupler. Since only three of the four ports of coupler 43a are being employed, its place, together with that of the two isolators 22a and 22b may be taken by an optical circulator 44.

Figure 5:
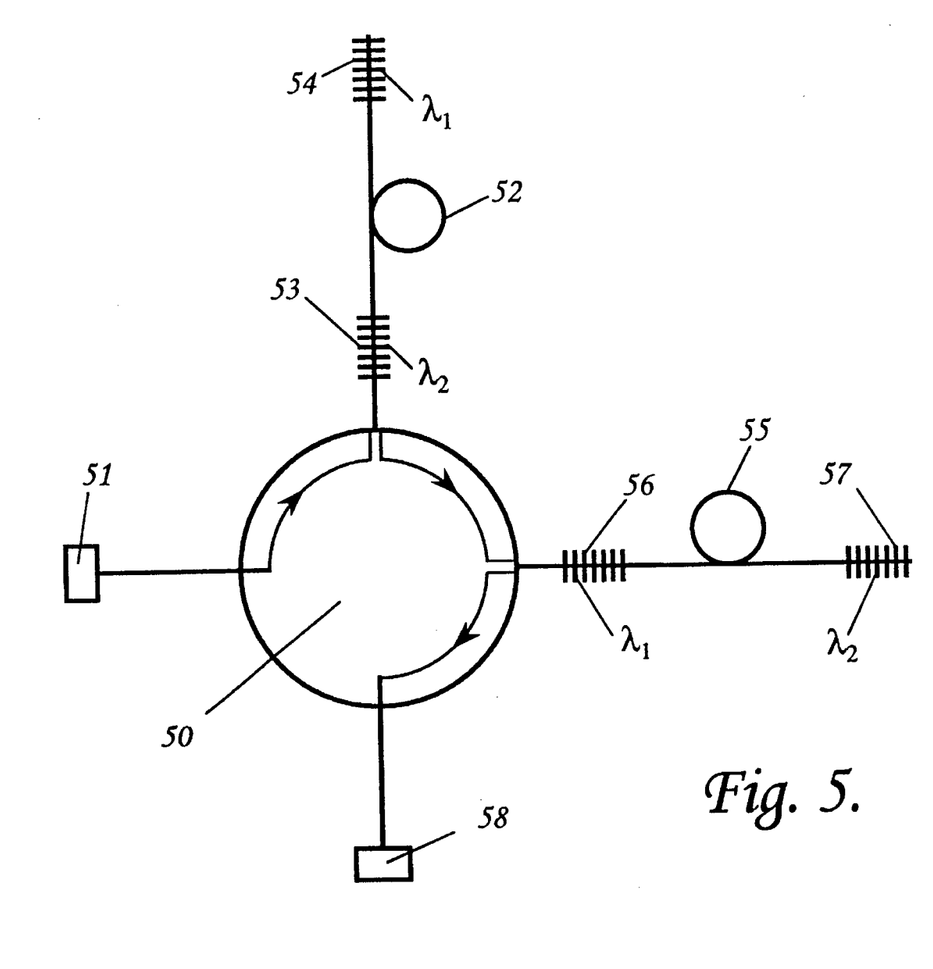

Each of the amplifiers of FIGS. 2, 3 and 4 has been depicted in a form that employs co-pumping for the first stage of amplification and counter pumping for the second. Additionally or alternatively both amplifier fibres may be pumped from their other ends through their respective Bragg reflective gratings 27a and 27b. Similar considerations apply in respect of the amplifier of FIG. 5 but in this instance, the pump or pumps and the multiplexers employed to multiplex pump power with signal power have, for simplicity of illustration, not been depicted. This amplifier uses a four-port optical circulator 50. The input port to this amplifier is provided by a port 51 connected to the first port of the circulator 50. Connected to the second port of the circulator is a length 52 of optically amplifying fibre having a pair of Bragg reflective gratings 53 and 54. The inboard grating 53 is reflective at $\lambda_2$, and the outboard grating is reflective at $\lambda_1$. Connected to the third port of the circulator is a similar length 55 of optically amplifying fibre, which is also provided with a pair of Bragg reflective gratings 56 and 57. In this instance the inboard grating 56 is reflective at $\lambda_1$, and the outboard grating 57 is reflective at $\lambda_2$. Connected to the fourth port of the circulator is a port 58 that constitutes the output port of the amplifier.

The amplifiers of FIGS. 2, 3, 4, and 5 have been designed for a wavelength multiplexed transmission system having only two wavelength multiplexed channels, but it should be clearly understood that the invention is applicable also to instances where more than two channels are wavelength multiplexed.

Figure 6:
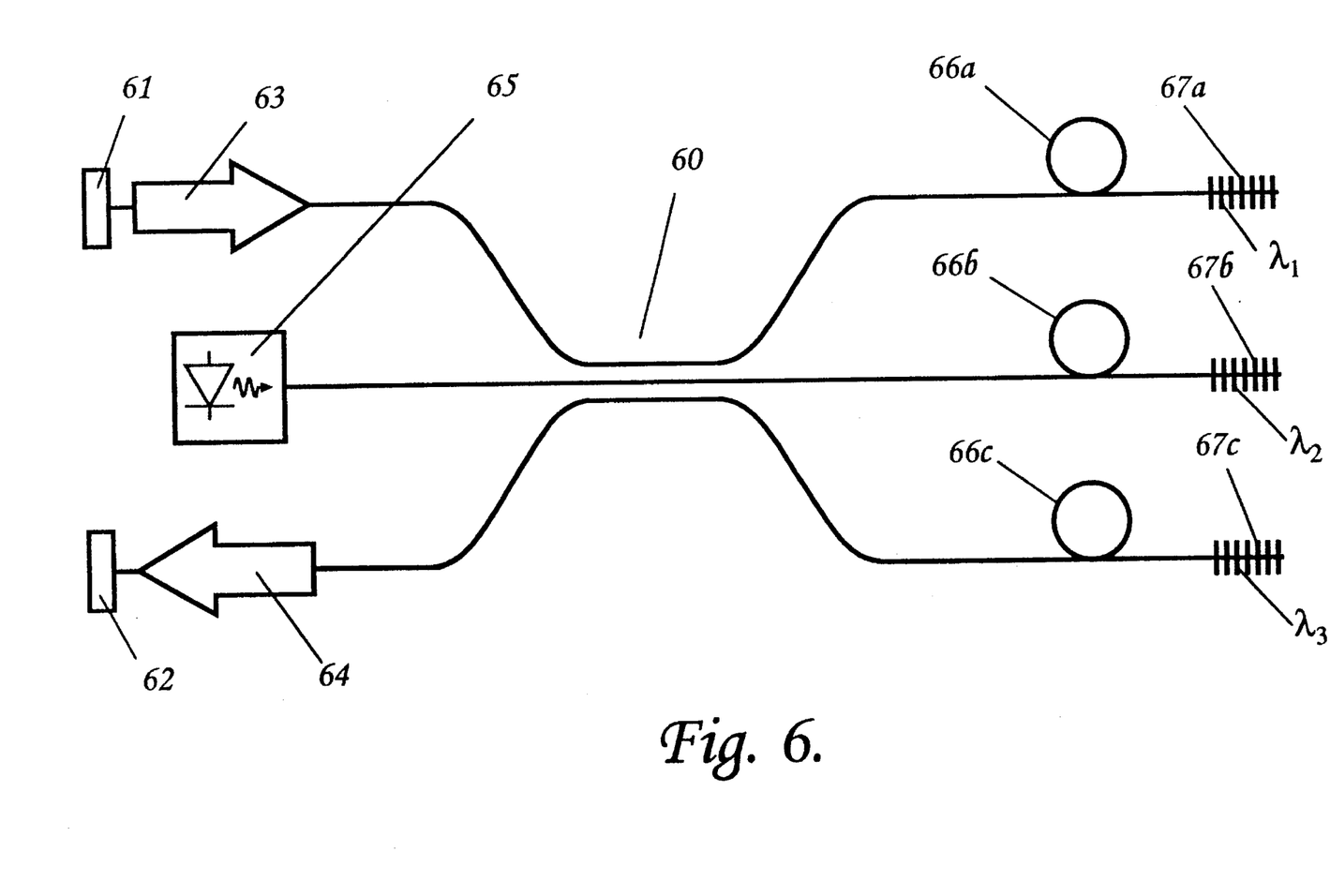

FIG. 6 depicts an amplifier designed for a three channel wavelength multiplexed system. This uses a 3×3 wavelength insensitive equal amplitude fibre coupler 60. It has input and output ports 61 and 62, isolators 63 and 64, an optical pump 65, and three lengths 66a 66b 66c of optically amplifying fibre, each respectively provided with a Bragg reflector 67a 67b 67c respectively reflective at $\lambda_1$, $\lambda_2$ and $\lambda_3$.

In the above-described amplifiers, when pumping is arranged to occur from only one end of each length of amplifying fibre, an increase in pump power utilisation efficiency may be obtainable by including additional Bragg reflectors (not shown). These are reflectors that are arranged to be selectively reflecting at the pump wavelength, and one such reflector is located at the end of each length of amplifying fibre that is optically remote from its pump. Pumping is not necessarily effected from only one end of each of the lengths of amplifying fibre and the amplifier of FIG. 7 differs from that of FIG. 2 only in the provision for pumping from both ends. The additional components required for this purpose comprise a further 3 dB fibre coupler 70 with two ports respectively coupled to reflectors 27a and 27b, a third port coupled to a further optical pump laser 71, and its fourth port optionally coupled with yet another optical pump laser 72.

Particularly in the case of the amplifiers of FIGS. 2, 3, 4 and 7 in which the use of the 3 dB coupler (23, and 43a respectively) means that only half the input signal power is usefully employed, it may be desirable to employ a pre-amplifier between this 3 dB coupler and the input 21a so as to improve noise performance of the amplifier. Such a pre-amplifier is employed in the optical amplifier of FIG. 8 which depicts the optical amplifier of FIG. 7 modified to include a pre-amplifier 80 and a further Bragg reflector 81. Signal power applied to the input 21a passes through isolator 22a and then through the series combination of the Bragg reflector 81 and pre-amplifier 80 before reaching the 3 dB coupler 23. The Bragg reflector 81 is selectively reflecting at the pump wavelength $\lambda_p$.

Figure 7:
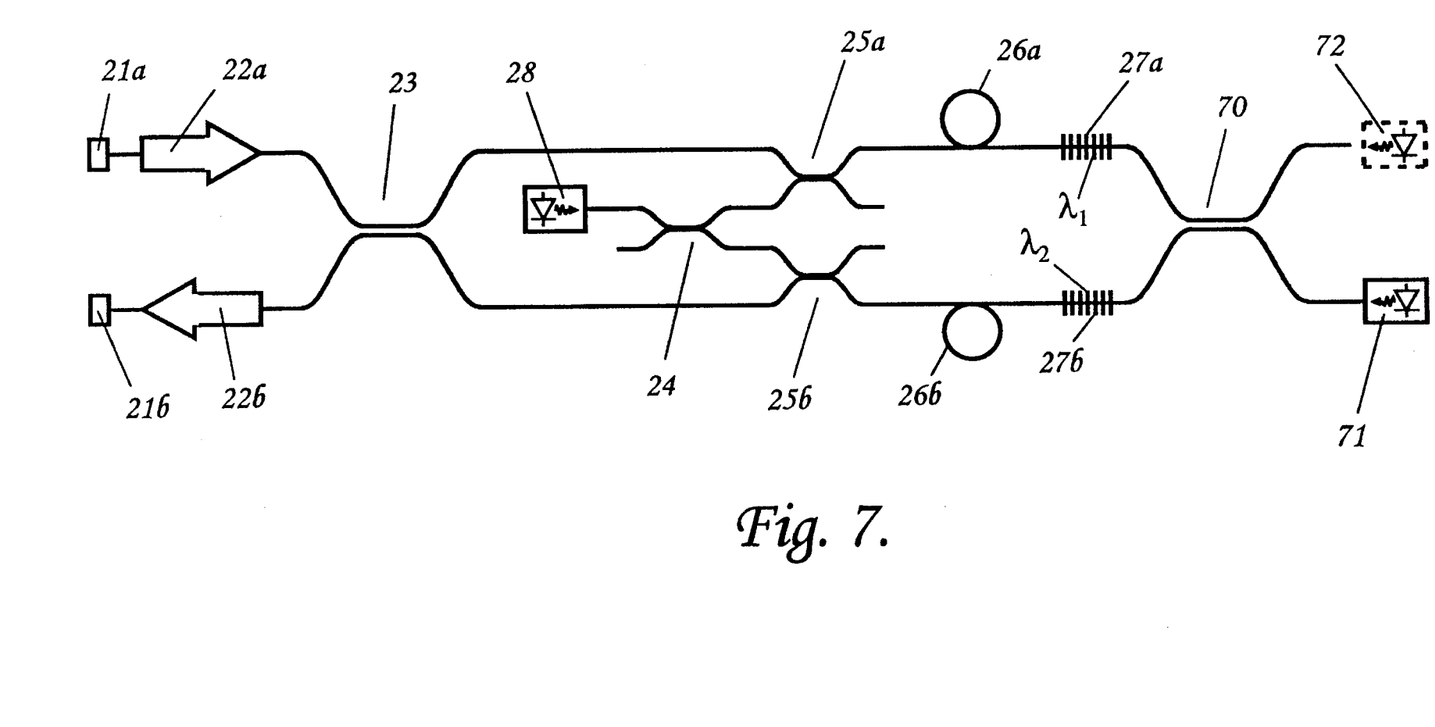
Figure 8:
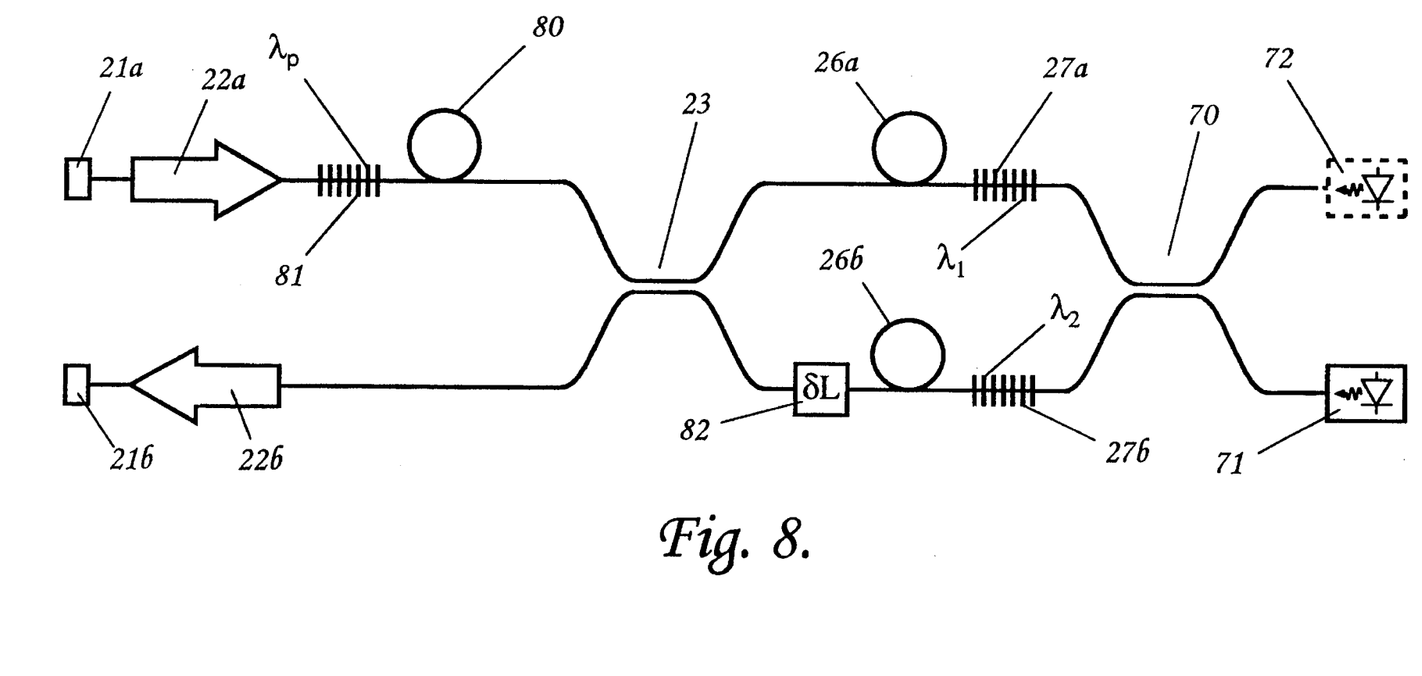

The amplifier of FIG. 7 is arranged to pump amplifying fibres 26a and 26b from both ends. In FIG. 8, primarily for illustrative convenience, pumping of these fibres from only one end is actually illustrated. Pumping from the end illustrated (i.e. using pumps 71 and/or 72) is necessary for pump light to reach the pre-amplifier amplifying fibre 80; whereas, if desired, additional pumping of the amplifying fibres 26a and 26b from their other ends may be omitted.

The tandem arrangement of the two 3 dB couplers 23 and 70 in the amplifiers of FIGS. 7 and 8 constitute a Mach Zehnder interferometer configuration. In the case of the amplifier of FIG. 7 there is no objection to the two interferometer arms being of equal length because it is not intended that signal power or pump power should propagate right through the tandem arrangement of both 3 dB couplers. This is not the situation for the amplifier of FIG. 8, where pump power is indeed required to propagate through both couplers in order to reach amplifying fibre 80, and therefore in this instance the two arms do need to be of unequal length, as indicated by the symbol 82. The division of pump power from pumps 71 and/or 72 between the arms of 3 dB coupler 23 respectively coupled to the input and output terminals 21a and 21b depends upon the phase relationship between the two components interfered by the 3 dB coupler 23, and this in its turn depends upon the wavelength of the pump. The Bragg reflector provides optical feedback tending to force pumps 71 and/or 72 each to lase at a wavelength for which the phase relationship is such as to couple its light substantially exclusively into the arm of 3 dB coupler 23 that is optically coupled with input terminal 21a, and hence which maximises the pumping of the pre-amplifier.

We claim:

1. In a wavelength division multiplexed transmission system having a transmission path including a concatenation of optical amplifiers, a method of reducing the disparity in signal power of the multiplexed channels by performing an amplification of at least one of the amplifiers in a manner such that the final portion of the amplification of each channel in that amplifier is performed, after reflection in a channel selective reflector, separately from the final portion of the amplification of each of the other channels.

2. An optical amplifier including a plurality of optically amplifying waveguides $w/g_1$ to $w/g_n$, each provided with an associated spectrally selective reflector $r_1$ to $r_n$ respectively reflective at spectrally separated wavebands $\lambda_1$ to $\lambda_n$, which plurality of optically amplifying waveguides is optically coupled with a waveguide splitter/combiner such that an optical signal having different spectral components in different ones of the wavebands $\lambda_1$ to $\lambda_n$ that is launched into an input terminal of the waveguide splitter/combiner is emitted from an output terminal thereof after the different components have propagated through different ones of the optically amplifying waveguides $w/g_1$ to $w/g_n$, each after reflection in its associated spectrally selective reflector.

3. An optical amplifier as claimed in claim 2, wherein each of the optically amplifying waveguides is optically coupled with the splitter/combiner via an attenuator that selectively attenuates each of the wavebands $\lambda_1$ to $\lambda_n$ other than the waveband reflected by the spectrally selective reflector with which that optically amplifying waveguide is associated.

4. An optical amplifier as claimed in claim 2, wherein the plurality of optically amplifying waveguides is constituted by two optically amplifying waveguides, and wherein the splitter/combiner is constituted by an optical waveguide 2×2 wavelength multiplexing coupler, which coupler is optically in series with a 3 dB wavelength insensitive coupler.

5. An optical amplifier as claimed in claim 2, wherein the plurality of optically amplifying waveguides is constituted by two optically amplifying waveguides, and wherein the splitter/combiner is constituted by an optical waveguide 2×2 wavelength multiplexing coupler, which coupler is optically in series with an optical circulator.

6. An optical amplifier as claimed in claim 2, wherein the plurality of optically amplifying waveguides is constituted by three optically amplifying waveguides, and wherein the splitter/combiner is constituted by a 3×3 wavelength insensitive coupler having a coupling region optically on one side of which is a first set of three ports respectively coupled with the three optically amplifying waveguides, and optically on the other side of which is a second set of three ports respectively the input and output terminals of the splitter/combiner and a terminal for the input of optical pump power for pumping the optically amplifying waveguides.

7. An optical amplifier as claimed in claim 2, wherein the splitter/combiner is constituted by an (n+2)-port optical circulator provided with a set of n spectrally selective reflectors by which the optically amplifying waveguides are individually coupled with the circulator each member of the set being selectively reflecting at each of the wavebands $\lambda_1$ to $\lambda_n$ other than the waveband reflected by the spectrally selective reflector associated the optically amplify rag waveguide that is coupled with the circulator by that member.

8. An optical amplifier as claimed in claim 2, wherein a preamplifier optically amplifying waveguide is optically coupled with the input terminal of the splitter/combiner, which splitter/combiner is constituted by a 3 dB wavelength insensitive coupler, which amplifier includes at least one optical pump provided with optical feedback via the 3 dB coupler from a spectrally selective reflector located on the side of the pre-amplifier waveguide optically remote from the splitter/combiner.

9. An optical amplifier as claimed in claim 2, wherein a preamplifier optically amplifying waveguide is optically coupled with the input terminal of the splitter/combiner, which splitter/combiner is constituted by a 3 dB wavelength insensitive coupler, which amplifier includes at least one optical pump provided with optical feedback via the 3 dB coupler from a spectrally selective reflector located on the side of the pre-amplifier waveguide optically remote from the splitter/combiner.

10. An optical transmission system for the transmission of a set of wavelength multiplexed optical signal channels, said set consisting of a set of mutually exclusive subsets each of at least one channel, which transmission system includes a plurality of optical amplifiers optically in cascade at least one of which optical amplifiers is an optical amplifier as claimed in claim 2.

* * * * *